US010445040B2

(12) United States Patent
Tsuji et al.

(10) Patent No.: US 10,445,040 B2
(45) Date of Patent: Oct. 15, 2019

(54) INFORMATION PROCESSING APPARATUS, TAPE PRINTING APPARATUS, AND DISPLAY CONTROL METHOD OF INFORMATION PROCESSING APPARATUS

(71) Applicant: SEIKO EPSON CORPORATION, Tokyo (JP)

(72) Inventors: Akinori Tsuji, Shiojiri (JP); Seiji Tanaka, Asumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/766,069

(22) PCT Filed: Sep. 28, 2016

(86) PCT No.: PCT/JP2016/004370
§ 371 (c)(1),
(2) Date: Apr. 5, 2018

(87) PCT Pub. No.: WO2017/061083
PCT Pub. Date: Apr. 13, 2017

(65) Prior Publication Data
US 2018/0307449 A1     Oct. 25, 2018

(30) Foreign Application Priority Data

Oct. 7, 2015   (JP) .................. 2015-199332

(51) Int. Cl.
*G06F 3/12*     (2006.01)
*G06K 15/02*    (2006.01)
(Continued)

(52) U.S. Cl.
CPC .......... *G06F 3/1256* (2013.01); *B41J 3/4075* (2013.01); *G06F 3/1217* (2013.01);
(Continued)

(58) Field of Classification Search
CPC ...... G06F 3/1256; G06F 3/1251; G06F 3/127; B41J 3/4075; H04N 1/00161; H04N 1/0044; G06K 15/022
See application file for complete search history.

(56) References Cited

U.S. PATENT DOCUMENTS 5,479,206 A * 12/1995 Ueno ................. H04N 1/00236
                                                 348/143
6,293,717 B1 * 9/2001 Kurashina ............ B41J 3/4075
                                                 400/61
(Continued)

FOREIGN PATENT DOCUMENTS

| JP | 2010-173072 A |   | 8/2010 |
|----|---------------|---|--------|
| JP | 2010173072 A  | * | 8/2010 |
| JP | 2010-221429 A |   | 10/2010 |

*Primary Examiner* — Ted W Barnes
(74) *Attorney, Agent, or Firm* — Foley & Lardner LLP (57) ABSTRACT

An information processing apparatus includes a file name reading unit that reads a file name including form information indicating a printing form of an image to be printed, a preview image generating unit that specifies the printing form from the read file name, and generates a simple preview image of the image based on the printing form, and a selection display unit that displays the simple preview image as a selection for selecting the image which is desired.

9 Claims, 9 Drawing Sheets (51) Int. Cl.
*H04N 1/00* (2006.01)
*H04N 1/387* (2006.01)
*B41J 3/407* (2006.01)

(52) U.S. Cl.
CPC ......... *G06F 3/1251* (2013.01); *G06K 15/022* (2013.01); *H04N 1/0044* (2013.01); *H04N 1/00161* (2013.01); *H04N 1/00665* (2013.01); *H04N 1/387* (2013.01); *H04N 1/3875* (2013.01)

(56) References Cited

U.S. PATENT DOCUMENTS

| | | | | |
|---|---|---|---|---|
| 6,947,158 | B1* | 9/2005 | Kitamura | G06F 3/1204 358/1.13 |
| 7,423,769 | B2* | 9/2008 | Yu | G06F 3/1205 358/1.1 |
| 7,625,145 | B2* | 12/2009 | Tanaka | G09B 21/02 400/109.1 |
| 7,812,979 | B2* | 10/2010 | Takada | B41J 3/32 345/581 |
| 9,292,768 | B2* | 3/2016 | Kajihara | G06K 15/024 |
| 9,489,456 | B1* | 11/2016 | Vidwans | G06F 16/183 |
| 2002/0048413 | A1* | 4/2002 | Kusunoki | H04N 1/00132 382/282 |
| 2003/0011815 | A1* | 1/2003 | Kita | H04N 1/00204 358/1.15 |
| 2005/0108215 | A1* | 5/2005 | Thomas | G06T 15/005 |
| 2005/0152002 | A1* | 7/2005 | Shirakawa | H04N 1/3871 358/1.18 |
| 2006/0197986 | A1* | 9/2006 | Takada | B41J 3/32 358/1.18 |
| 2006/0228146 | A1* | 10/2006 | Takayama | B41J 3/32 400/109.1 |
| 2006/0259501 | A1* | 11/2006 | Suzuki | G11B 20/00086 |
| 2008/0152188 | A1* | 6/2008 | Yokokura | H04N 1/00408 382/100 |
| 2008/0170271 | A1* | 7/2008 | Lee | G06Q 10/107 358/402 |
| 2009/0066730 | A1* | 3/2009 | Mikawa | G06T 3/40 345/661 |
| 2010/0020363 | A1* | 1/2010 | Yoshida | H04N 1/00411 358/468 |
| 2010/0074437 | A1* | 3/2010 | Inami | H04N 1/0044 380/28 |
| 2010/0118338 | A1* | 5/2010 | Sakiyama | H04N 1/00411 358/1.15 |
| 2011/0040747 | A1* | 2/2011 | Brad | G06F 16/84 707/722 |
| 2012/0050797 | A1* | 3/2012 | Tamura | H04N 1/00503 358/1.15 |
| 2012/0069371 | A1* | 3/2012 | Fujii | G06F 3/1208 358/1.13 |
| 2013/0003123 | A1* | 1/2013 | Takada | G06K 15/022 358/1.15 |
| 2013/0019160 | A1* | 1/2013 | Bando | H04N 1/00244 715/234 |
| 2013/0148142 | A1* | 6/2013 | Kido | G06K 15/024 358/1.11 |
| 2013/0198454 | A1* | 8/2013 | Sparenberg | G06F 12/126 711/118 |
| 2013/0335775 | A1* | 12/2013 | Oonami | G06F 3/1256 358/1.15 |
| 2014/0268237 | A1* | 9/2014 | Yonezawa | G06F 3/1212 358/1.15 |
| 2014/0355060 | A1* | 12/2014 | Kamoi | G06F 3/1256 358/1.15 |
| 2016/0028904 | A1* | 1/2016 | Nitta | H04N 1/00352 358/474 |
| 2016/0107453 | A1* | 4/2016 | Ishii | G06F 17/211 347/214 |
| 2016/0246555 | A1* | 8/2016 | Tsuji | G06F 3/1251 |

* cited by examiner

FILE NAME: PunchBlock_B8_Ini1_Ini1_Ini25

SIMPLE PREVIEW IMAGE:

FILE NAME: PatchPanel_B5_Ini1

SIMPLE PREVIEW IMAGE:

FILE NAME: Wrap_ABC_123_dia20

SIMPLE PREVIEW IMAGE:

FILE NAME: Flag_ABC_Text50_Wou20

SIMPLE PREVIEW IMAGE:

INFORMATION PROCESSING APPARATUS, TAPE PRINTING APPARATUS, AND DISPLAY CONTROL METHOD OF INFORMATION PROCESSING APPARATUS

TECHNICAL FIELD

The present invention relates to an information processing apparatus which displays a preview image as a selection for selecting a desired printing image, a tape printing apparatus, and a display control method of the information processing apparatus.

BACKGROUND ART

As such type of a technique, for example, PTL 1 is known. In PTL 1, a technique of displaying a reduced image in which at least a part of the printing image is reduced on a display screen as a selection (thumbnail) for selecting a desired printing image (file) is disclosed. Therefore, when the reduced image is previewed, all of the printing images can be checked even on a small display screen, and thus there is an advantage that the desired printing image is easily found.

CITATION LIST

Patent Literature

PTL 1: Japanese Unexamined Patent Application Publication No. 2010-173072

SUMMARY OF INVENTION

Technical Problem

However, as PTL 1 described above, in a configuration in which a reduced image is generated from the printing image and is previewed, in a case in which there are many selections, a lot of calculating processes are required to generate the reduced image. Therefore, it takes much time to display the preview image.

In the view of the above-described problem, an object of the invention is to provide an information processing apparatus capable of quickly displaying a preview image which is displayed in order to find a desired image, a tape printing apparatus, and a display control method of the information processing apparatus.

Solution to Problem

The invention provides an information processing apparatus including a file name reading unit that reads a file name which is a file name of an image to be printed and includes form information indicating a printing form of the image, a preview image generating unit that specifies the printing form from the read file name, and generates a simple preview image of the image based on the printing form, and a selection display unit that displays the simple preview image as a selection for selecting the image which is desired.

The invention provides a tape printing apparatus including a file name reading unit that reads a file name which is a file name of an image to be printed on a lable and includes form information indicating a printing form of the image, a preview image generating unit that specifies the printing form from the read file name, and generates a simple preview image of the image based on the printing form, and a selection display unit that displays the simple preview image as a selection for selecting the image which is desired.

The invention provides a display control method of an information processing apparatus including a file name reading step of reading a file name which is a file name of an image to be printed and includes form information indicating a printing form of the image, a preview image generating step of specifying the printing form from the read file name, and generating a simple preview image of the image based on the printing form, and a selection display step of displaying the simple preview image as a selection for selecting the image which is desired.

The invention specifies the printing form from the file name of the image to be printed, and generates the simple preview image based on the printing form. As described above, the preview image is simply generated based on the printing form specified from the file name, and thus it is possible to display the preview image in a short time. In addition, since the image (file) itself does not need to be read, time taken for reading can be also reduced. Particularly, in a case of a configuration in which the file is stored in an external device and the file is read by accessing the external device, the simple preview image can be displayed without loading file data, and thus it is more effective.

In the information processing apparatus described above, the image is a printing image to be printed on a label, and the form information is information indicating types of the label and the number of printing elements to be printed on the label.

According to the configuration of the invention, since the types of the label and the number of the printing elements to be printed on the label can be reflected to the simple preview image, a user checks the types of the label and the number of the printing elements, and then, can easily find a desired printing image.

In the information processing apparatus described above, the information processing apparatus further includes a file name generating unit automatically generates the file name including the form information when the printing image is stored, and a memory unit that memorizes the printing image and the file name in association with each other, in which the file name reading unit reads the file name from the memory unit.

According to the configuration of the invention, since the file name is automatically generated, it is possible to save troubles of inputting the file name by the user and to prevent erroneous input. In addition, even in a case in which many people use the printing image, applying methods of file names by a user are not different from one another, and thus each user can easily assume the printing image from not only the simple preview image but also the file name.

In the information processing apparatus described above, the printing image includes characters, the file name generating unit automatically generates the file name including at least a part of the characters to be printed on the label, and the preview image generating unit generates the simple preview image including at least a part of the characters to be printed on the label.

According to the configuration of the invention, since at least a part of the characters to be printed on the label can be reflected to the simple preview image, the user checks the part of the characters, and then, can easily find the desired printing image.

In the information processing apparatus described above, at least a part of the characters is a first character which is an initial printing element to be printed on the label, and/or is a last character which is a final printing element to be printed on the label.

According to the configuration of the invention, since the first character and/or the last character to be printed on the label are often characteristic (important) information, these characters are reflected to the simple preview image, and thus it is possible to accurately find the desired printing image.

In the information processing apparatus described above, the file name generating unit automatically generates a file name including one or more information items of a label width, a label length, a label color, and a color of a character of the label, and the preview image generating unit generates the simple preview image based on at least one or more information items of the label width, the label length, the label color, the color of the character of the label included in the file name.

According to the configuration of the invention, since at least one or more information items of the label width, the label length, the label color, and the color of the character of the label can be reflected to the simple preview image, the user checks the information, and then, can easily find the desired printing image.

DESCRIPTION OF EMBODIMENTS

[First Embodiment]

Hereinafter, an information processing apparatus, a tape printing apparatus, and a display control method of the information processing apparatus of the invention will be described with reference to attached drawings. In this embodiment, a case in which an information processing apparatus of the invention is realized by a personal computer (hereinafter, referred to as a "PC") 2 is exemplified.

Figure 1:
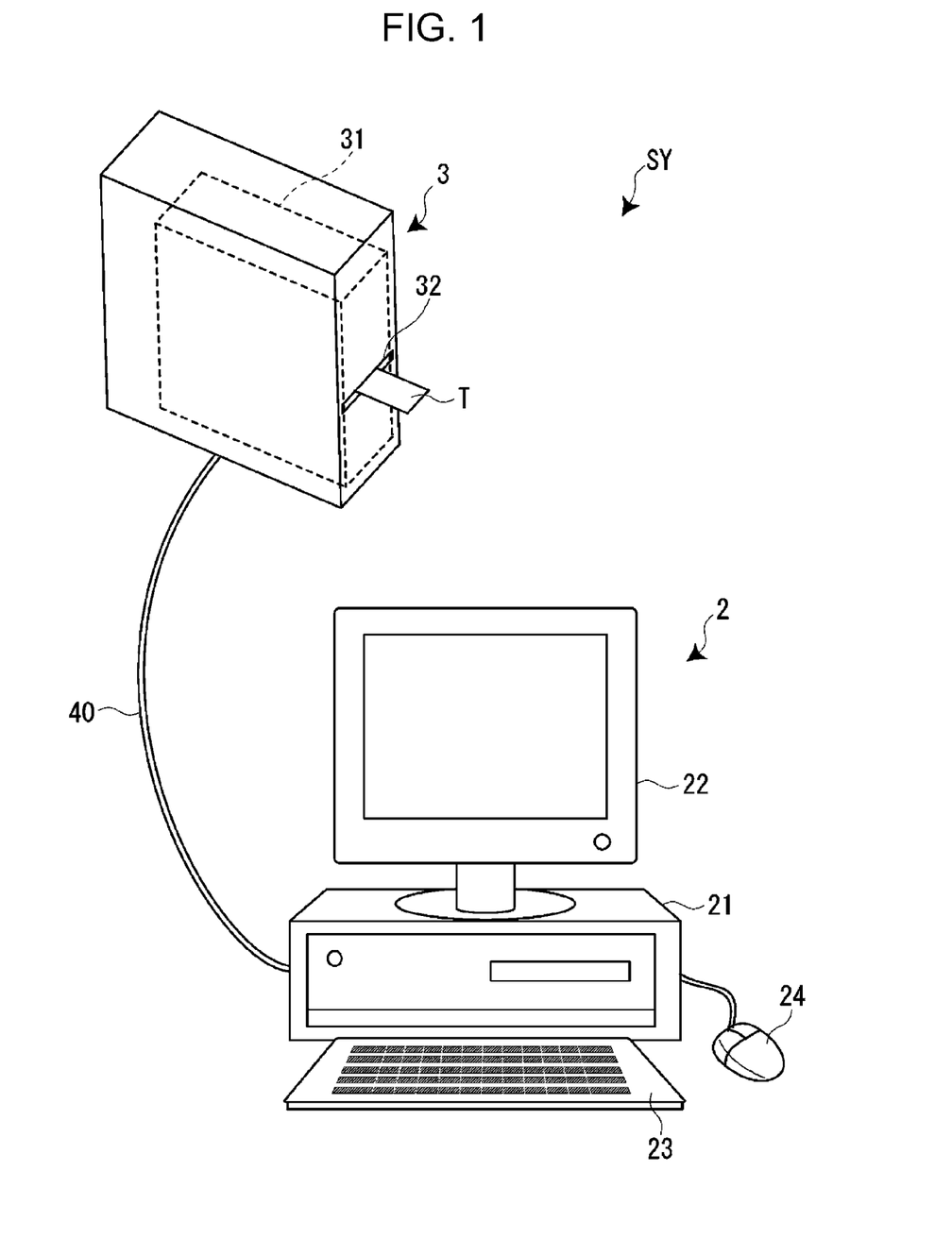
FIG. 1 is a configuration view of a printing system according to an embodiment of the invention.

FIG. 1 is a configuration view of a printing system SY according to an embodiment of the invention. As illustrated in this drawing, the printing system SY includes a PC 2 and a tape printing apparatus 3 creating a label by performing printing on a printing tape T which is a long printing medium.

The PC 2 has a configuration of a general computer such as a PC main body 21, a display screen 22, a keyboard 23, and a mouse 24. In addition, the PC 2 communicates with the tape printing apparatus 3 through a USB cable 40. Also, the communication between the PC 2 and the tape printing apparatus 3 is not limited to a USB standard, and the other standard such as Ethernet (registered trademark) may be used. In addition, a wireless communication standard such as Bluetooth (registered trademark) may be used.

When the tape printing apparatus 3 is provided with a tape cartridge 31, in which the printing tape T and an ink ribbon are accommodated, mounted thereto, and receives printing data from the PC 2, the tape printing apparatus feeds out the printing tape T from the tape cartridge 31 and performs a printing process and a cutting process on the tape. A printed part of the printing tape T is discharged from a tape discharging hole 32 after the cutting process, and is used as a label. Also, in the embodiment, a case in which, as a label, a punch block label L1 (a label clearly specifying a terminal name of a punch block) or a patch panel label L2 (a label clearly specifying a terminal name of a patch panel) is created is exemplified (refer to FIGS. 7 and 10).

Figure 2:
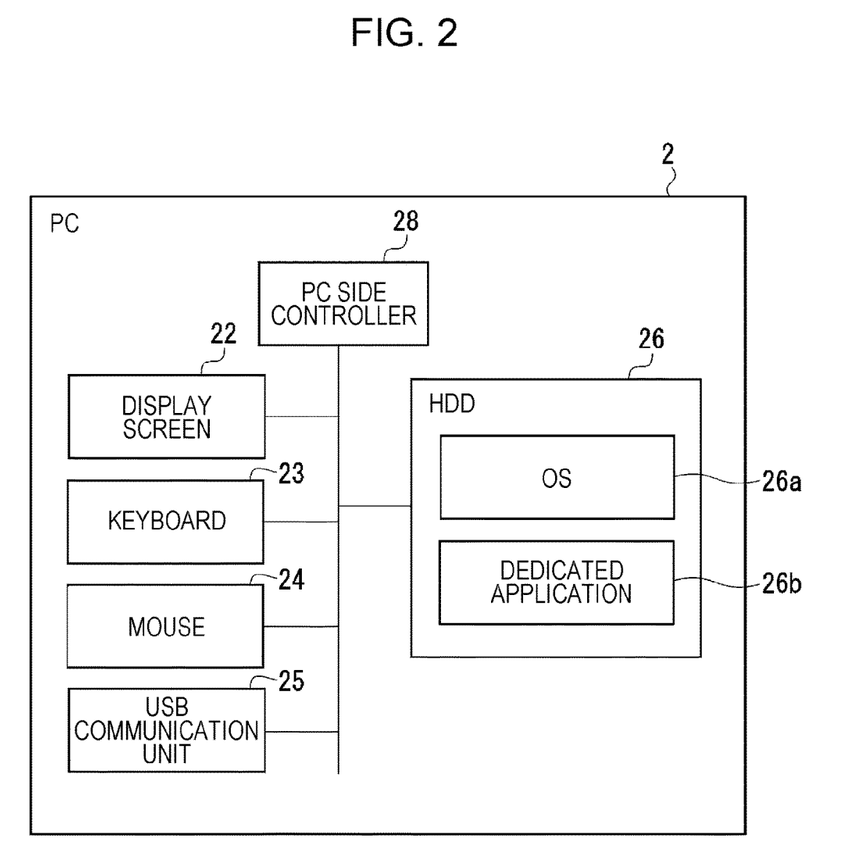
FIG. 2 is a block diagram illustrating a configuration of a hardware of a PC.

Next, with reference to FIGS. 2 and 3, configurations of hardware of the PC 2 and the tape printing apparatus 3 will be described. FIG. 2 is a block diagram of the PC 2. The PC 2 includes a USB communication unit 25, a hard disk drive (HDD) 26, and a PC side controller 28, in addition to the display screen 22, the keyboard 23, and the mouse 24 illustrated in FIG. 1 as the configuration of the hardware.

Figure 5:
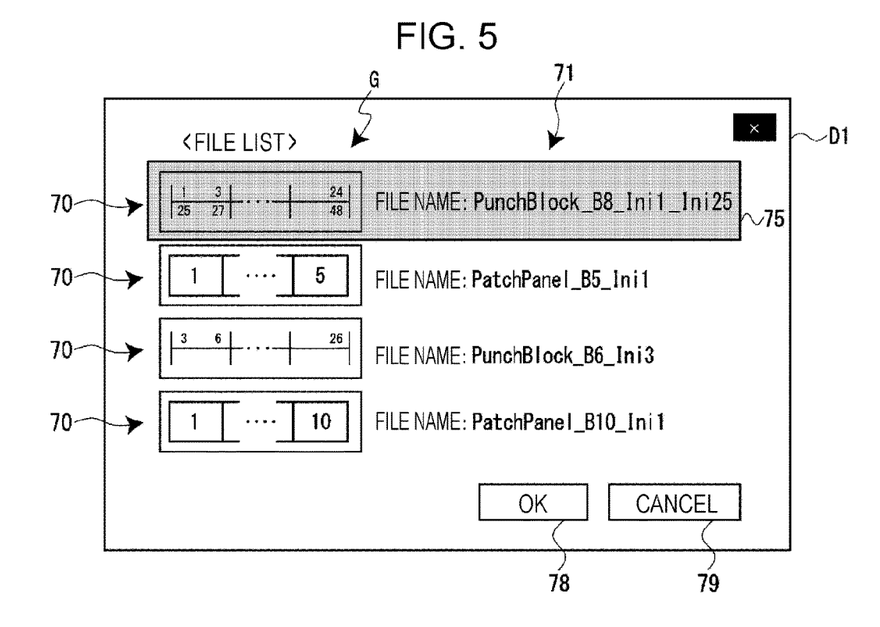
FIG. 5 is a diagram illustrating an example of a file list screen.
Figure 6:
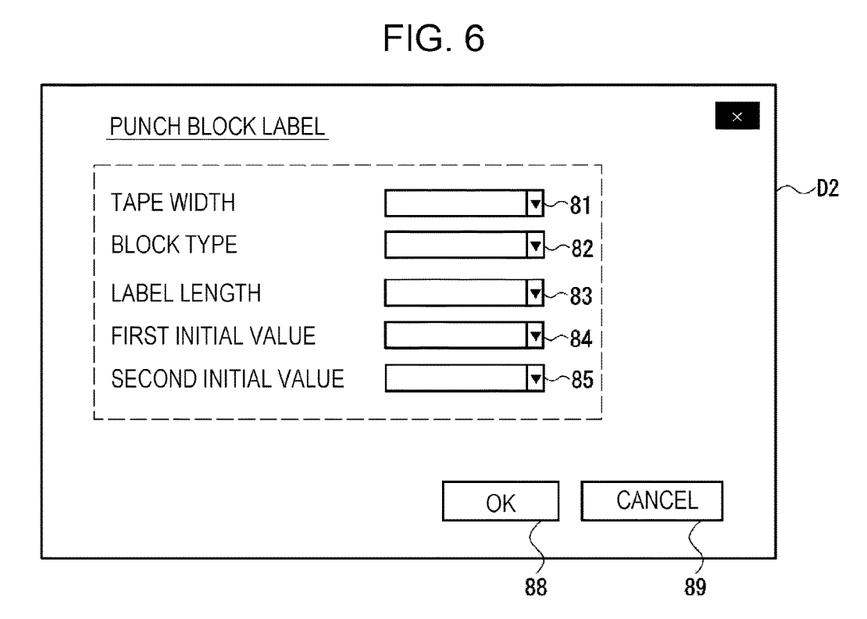
FIG. 6 is a diagram illustrating an example of a punch block label editing screen.
Figure 9:
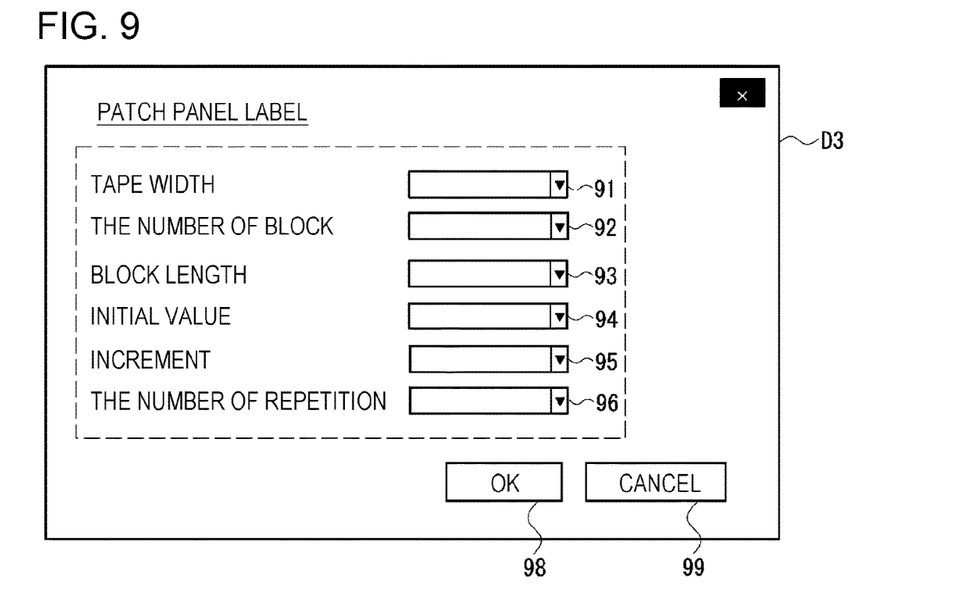
FIG. 9 is a diagram illustrating an example of a patch panel label editing screen.

The display screen 22 displays various information items such as a file list screen D1 (refer to FIG. 5), or a label editing screens D2 and D3 (FIGS. 6 and 9). The keyboard 23 and the mouse 24 are used for performing a selecting operation or an editing operation of various selections. The USB communication unit 25 communicates with the tape printing apparatus 3 based on a USB communication standard.

The HDD 26 memorizes an operating system (OS) 26a and a dedicated application 26b. The dedicated application 26b is an application for generating printing data being output to the tape printing apparatus 3. The PC side controller 28 is realized by a central processing unit (CPU), a random access memory (RAM), and the like, cooperates with each of the units described above (reference numerals 22 to 26), and performs a generating process of the printing data or a control of communication with the tape printing apparatus 3.

Figure 3:
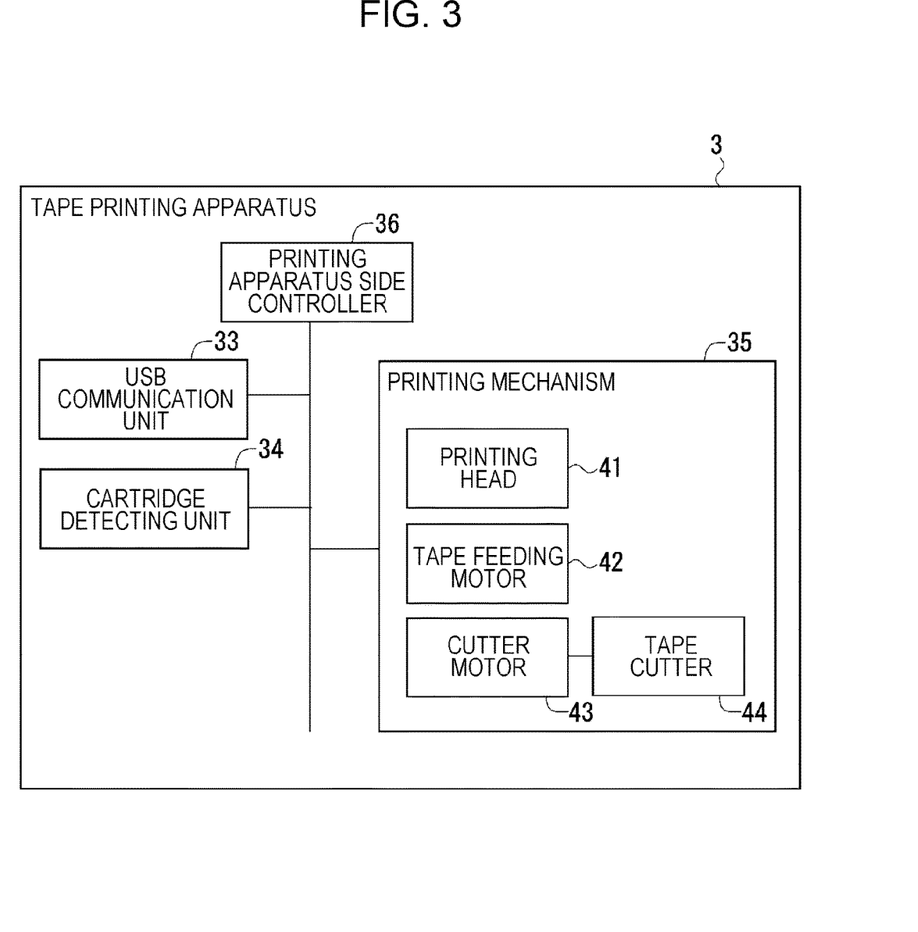
FIG. 3 is a block diagram illustrating a configuration of a hardware of a tape printing apparatus.

FIG. 3 is a block diagram of the tape printing apparatus 3. The tape printing apparatus 3 includes a USB communication unit 33, a cartridge detecting unit 34, a printing mechanism 35, and a printing apparatus side controller 36 as a configuration of a hardware.

The USB communication unit 33 communicates with the PC 2 by a USB communication. The cartridge detecting unit 34 detects data information relating to the printing tape T accommodated in the tape cartridge 31. The cartridge detecting unit detects, as the data information, a tape width, a tape material, and a tape color of the printing tape T, an ink color of an ink ribbon, and the like. As a detecting method, a method of reading an information item (barcode, two-dimensional code, or the like) or a radio frequency identification (RFID) attached to or printed on the tape cartridge 31, a method of detecting presence or absence of one or more holes formed in the tape cartridge 31, or the like is considered. Also, the detected data information (for example, tape width) is reflected to tape width selecting fields 81 and 91 or the like of the label editing screens D2 and D3 (refer to FIGS. 6 and 9).

The printing mechanism 35 includes a printing head 41, a tape feeding motor 42, a cutter motor 43, and a tape cutter 44. The printing head 41 is a thermal head, and performs printing by pinching the fed printing tape T and the ink ribbon between the printing head and a platen roller (not illustrated). The tape feeding motor 42 transports the fed printing tape T to the tape discharging hole 32 (refer to FIG. 1) from the printing head 41. The cutter motor 43 drives the tape cutter 44, and cuts a printed part of the printing tape T in a tape width direction in a state in which tape feeding temporarily stops.

The printing apparatus side controller 36 is realized by a CPU, a RAM, or the like, cooperates with each of the units described above (reference numerals 33 to 35), and performs a control communication with or a printing control of the PC 2. Specifically, when the tape cartridge 31 is mounted, or there is an inquiry about the PC 2, the data information detected by the cartridge detecting unit 34 is transmitted to the PC 2 through the USB communication unit 33. In addition, the printing apparatus side controller receives the printing data through the USB communication unit 33 from the PC 2, and controls the printing mechanism 35 based on the printing data.

Figure 4:
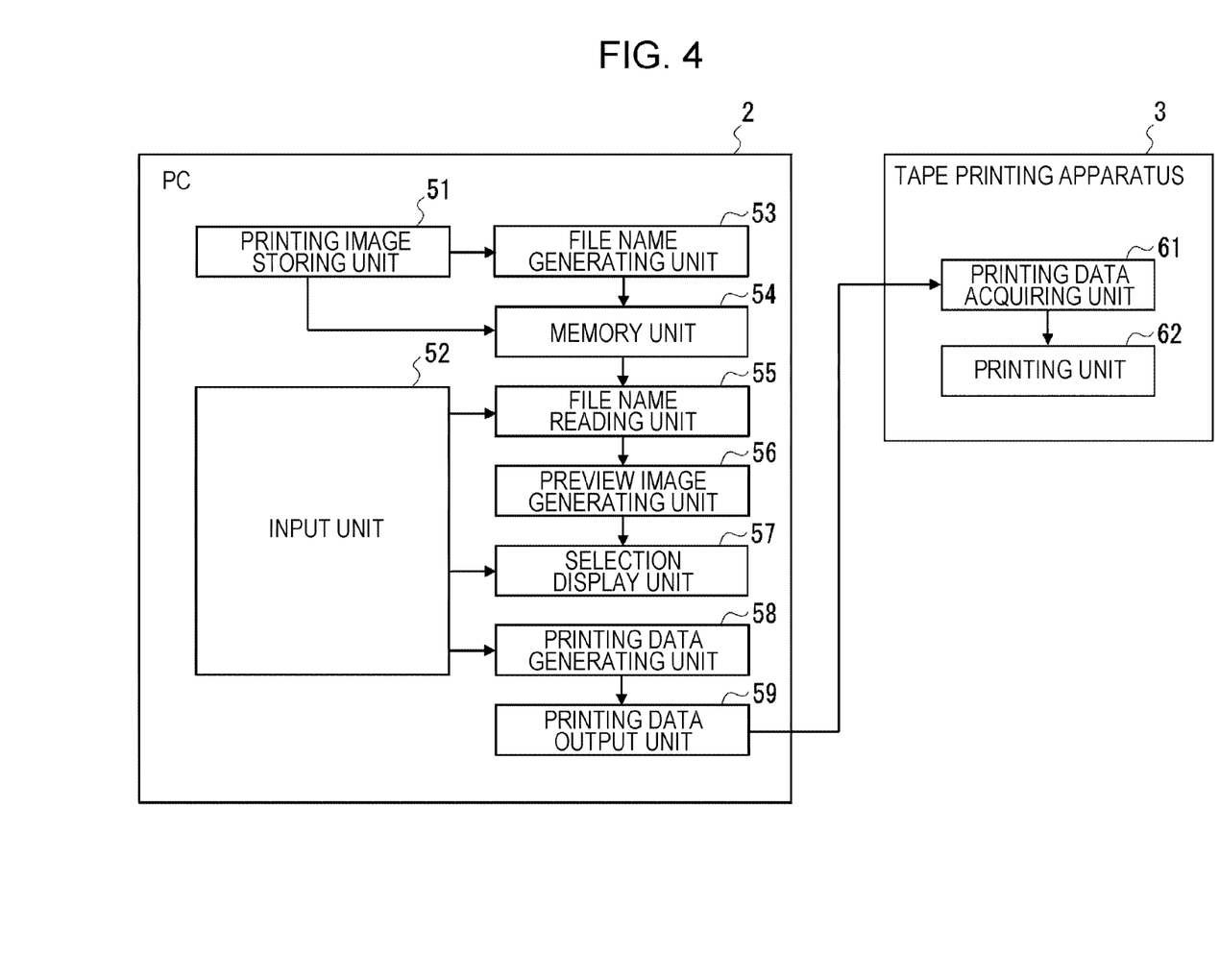
FIG. 4 is a block diagram illustrating functional configurations of the PC and the tape printing apparatus.

Next, with reference to FIG. 4, functional configurations of the PC 2 and the tape printing apparatus 3 will be described. The PC 2 includes, as a functional configuration, a printing image storing unit 51, an input unit 52, a file name generating unit 53, a memory unit 54, a file name reading unit 55, a preview image generating unit 56, a selection display unit 57, a printing data generating unit 58, and a printing data output unit 59. The other functions of the input unit 52 and the memory unit 54 among the units are mainly provided by the dedicated application 26b (refer to FIG. 2) described above. In addition, the tape printing apparatus 3 includes, as functional configuration, a printing data acquiring unit 61 and a printing unit 62.

The printing image storing unit 51 stores the generated printing image in the memory unit 54 as a file based on a storing operation by a user. Also, when a predetermined trigger occurs, other than a timing when a user operates, for example, when printing is performed, a file may be automatically stored. The input unit 52 inputs information based on an operation of the keyboard 23 or the mouse 24.

The file name generating unit 53 automatically generates a file name of a printing image when the printing image storing unit 51 stores the printing image. The file name includes form information indicating a printing form used at the time of generating the printing image. Here, the "form information" means information indicating the types of a label L and the number of printing elements to be printed on the label L. The "types of the label L" indicates the punch block label L1, the patch panel label L2, and the like. In addition, the "number of the printing elements" indicates the number of blocks (the number thereof set depending on the number of terminals indicating a terminal name) in a case of the punch block label L1 or the patch panel label L2. In addition, the file name generating unit 53 generates a file name including at least a part of characters to be printed the label L, in addition to the form information. Details will be described later.

The memory unit 54 memorizes the printing image and the file name in a nonvolatile memory (HDD 26), in association with the printing image stored in the printing image storing unit 51 and the file name generated by the file name generating unit 53. The memory unit 54 may be also provided in the outside of the PC 2 (a server, a cloud computing, or the like accessible from the PC 2).

The file name reading unit 55 reads each file name of each printing image in the memory unit 54 based on a file name reading operation (instruction operation for displaying file list) by a user (file name reading step). The preview image generating unit 56 specifies a printing form of each printing image from the read file name, and generates a simple preview image G of each printing image based on the specified printing form (preview image generating step). That is, the preview image generating unit 56 generates the simple preview image G simply imitating the printing image based on the "file name", not the printing image itself (file itself) memorized in the memory unit 54.

The selection display unit 57 displays the simple preview image G of each printing image generated by the preview image generating unit 56 on the file list screen D1 to be described later (selection display step). The printing data generating unit 58 uses the selected file (printing image) on the file list screen D1, and generates printing data based on an editing operation of the input unit 52. The printing data output unit 59 outputs the printing data generated by the printing data generating unit 58 to the tape printing apparatus 3.

Meanwhile, the printing data acquiring unit 61 of the tape printing apparatus 3 acquires the printing data from the PC 2. The printing unit 62 performs printing on the printing tape T based on the acquired printing data, and creates various labels L.

Next, with reference to FIG. 5, the file list screen D1 will be described. The file list screen D1 displays one or more selections 70 for selecting a printing image that a user desires. Each selection 70 includes the simple preview image G and the file name 71. In addition, a box around a reference numeral 75 in the drawing indicates the selection 70 being selected. When a user selects the selection 70 and presses an OK button 78, the printing image corresponding to the selection 70 is read out from the memory unit 54. In addition, the read printing image is displayed on an image editing screen (a screen for editing the printing image) or a printing preview screen (both are not illustrated). Also, when a cancel button 79 on the file list screen D1 is pressed, the file list screen D1 is not displayed, and the screen is returned to the image editing screen or the label editing screens D2 and D3 illustrated in FIG. 6 or 9.

It is not particularly illustrated, an order of the selections 70 being displayed on the file list screen D1 can be changed with a file creating date, a file name, the types of a label, the number of printing elements (the number of blocks), a label length, a tape width (label width), the number of times of printing, a final printing date, and the like as a sort condition. In addition, the sort condition may be selected by a user.

Next, with reference to FIG. 6, the punch block label editing screen D2 will be described. The punch block label editing screen D2 displays editing items for creating the punch block label L1. Specifically, the punch block label editing screen displays the tape width selecting field 81, a block type selecting field 82, a label length selecting field 83, a first initial value selecting field 84, and a second initial value selecting field 85.

The tape width selecting field 81 displays a tape width of the printing tape T detected by the cartridge detecting unit 34. In addition, a user can randomly select a tape width other than the displayed tape width. In a case in which the tape width is changed, the user mounts the tape cartridge 31 having the corresponded tape width into the tape printing apparatus 3.

In the block type selecting field 82, a block type of the punch block is selected as one of "2" to "5". Based on the selected result of the block type, the number of blocks is determined. Specifically, it is "the number of blocks=24÷the block type". However, when the block type is "5", the number of blocks is set to "5".

The label length selecting field 83 is provided for selecting a label length of the punch block label L1. The first initial value selecting field 84 is provided for selecting an initial value of an upper side of the punch block label L1. The second initial value selecting field 85 is provided for selecting an initial value of a lower side of the punch block label L1. Also, in the punch block label editing screen D2, when an OK button 88 is pressed, contents to be edited are confirmed, and the printing preview screen is displayed. Otherwise, when the OK button 88 is pressed, the printing image may be stored, or the printing data may be output to the tape printing apparatus 3. In addition, when a cancel button 89 is pressed, contents to be edited on the punch block label editing screen D2 are invalidated.

Figure 7:
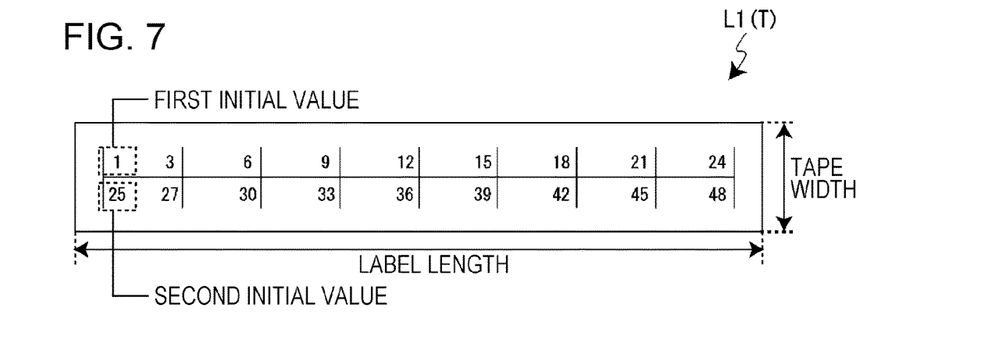
FIG. 7 is a diagram illustrating an example of creating a punch block label.

FIG. 7 is a view illustrating an example of creating the punch block label L1. In this drawing, in the punch block label editing screen D2 illustrated in FIG. 6, an example of creating labels in a case in which the block type "3", a first initial value "1", and a second initial value "25" are set is illustrated.

Figure 8:
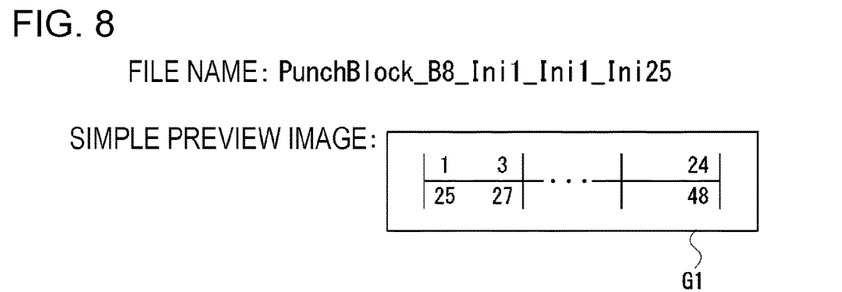
FIG. 8 is a diagram illustrating an example of a file name and an example of a simple preview image of the punch block label.

FIG. 8 is a diagram illustrating an example of a file name being generated by the file name generating unit 53 when the printing image of the punch block label L1 illustrated in FIG. 7 is stored, and an example of the simple preview image G1 generated by the preview image generating unit 56 based on the file name. In these examples in this drawing, the file name includes the types of the label, the number of blocks, the first initial value, and the second initial value. In addition, in these examples in this drawing, each item of the file name is divided by an under bar, but may be divided by a symbol other than the under bar, and the symbol for dividing the items may not be included. In addition, an order of the items is also set at random. In addition, the file name may include other editing items (for example, tape width, block type, label length, and the like). Further, in addition to the editing items, a file creating date, a character direction, a character size, and the like may be included in the file name in addition to the data information (label color: color of printing tape T, character color: color of ink ribbon, and the like) detected by the cartridge detecting unit 34.

Meanwhile, the simple preview image G1 illustrated in this drawing is generated based on the file name illustrated in this drawing, and a printing format is reflected based on the types of the label. In addition, a part (a first character "1 (initial printing element)", a second character "3", and last characters "24" of an upper side of the printing image, and first characters "25", second characters "27", and last characters "48 (final printing element)" of a lower side of the printing image) of characters to be printed on the punch block label L1 is reflected. Also, the simple preview image G1 illustrated in this drawing is described in a state in which an intermediate part of the printing tape T in a length direction is omitted, but a multiple-point reader indicating the omitted part may be illustrated by another symbol such as a break line.

Next, with reference to FIG. 9, the patch panel label editing screen D3 will be described. The patch panel label editing screen D3 displays editing items for creating the patch panel label L2. Specifically, the tape width selecting field 91, a number of blocks selecting field 92, a block length selecting field 93, an initial value selecting field 94, an increment selecting field 95, and a repetition frequency selecting field 96 are displayed.

The tape width selecting field 91 displays tape widths of the printing tapes T detected by the cartridge detecting unit 34. In addition, a user may randomly select a tape width other than the displayed tape widths. The number of blocks selecting field 92 is provided for selecting the number of blocks (=the number of terminals) of the patch panel label L2. The block length selecting field 93 is provided for selecting a block length which is a length of the printing tape T of each block in a longitudinal direction. Also, the label length may be selected instead of the block length. In this case, based on the label length and the number of blocks, the number of blocks is determined.

The initial value selecting field 94 is provided for selecting an initial value of the patch panel label L2. The increment selecting field 95 is provided for selecting increment of the numbers being input to each block. The repetition frequency selecting field 96 is provided for selecting repetition frequency of the number being input to each block. Also, in the patch panel label editing screen D3, when the OK button 98 is pressed, contents to be edited are confirmed, and the printing preview screen is displayed. Otherwise, when the OK button 98 is pressed, the printing image may be stored, and the printing data may be also output to the tape printing apparatus 3. In addition, when the cancel button 99 is pressed, the contents to be edited of the patch panel label editing screen D3 are invalidated.

Figure 10:
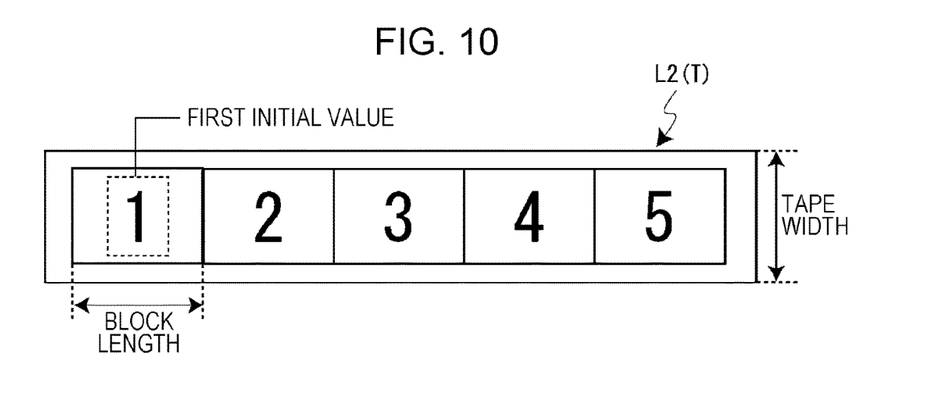
FIG. 10 is a diagram illustrating an example of creating a patch panel label.

FIG. 10 is a diagram illustrating an example of creating the patch panel label L2. In this drawing, in the patch panel label editing screen D3 illustrated in FIG. 9, an example of creating the label in a case in which the number of blocks "5", the initial value "1", the increment "1", and the repetition frequency "1" are set is illustrated.

Figure 11:
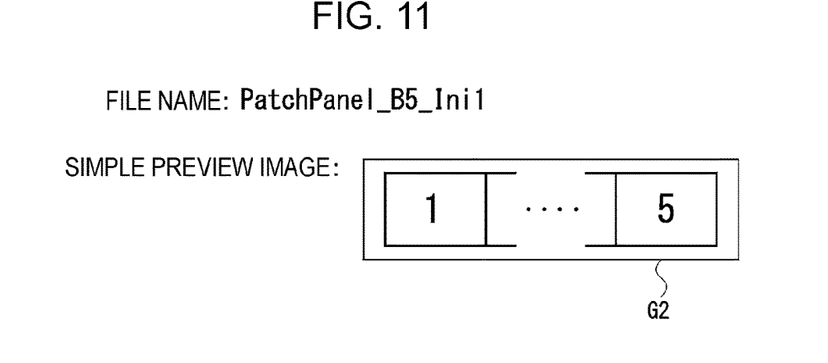
FIG. 11 is a diagram illustrating an example of the file name and an example of the simple preview image of the patch panel label.

FIG. 11 is a diagram illustrating an example of a file name generated by the file name generating unit 53 when the printing image of the patch panel label L2 illustrated in FIG. 10 is stored, and an example of the simple preview image G2 generated by the preview image generating unit 56 based on the file name. In these examples in this drawing, the file name includes the types of the label, the number of blocks, and the initial value. Also, the file name is not limited to description thereof in this drawing, and a modification example the same as the punch block label L1 may be considered. In addition, the file name may include editing items such as the block length, the label length, the increment, and the repetition frequency. In addition, the simple preview image G2 illustrated in this drawing is generated based on the file name illustrated in this drawing, and the printing format based on the types of the label and the first character "1" and the last character "5" to be printed on the patch panel label L2 are reflected thereto.

As described above, according to the first embodiment, since the printing form (the types of the label and the number of the printing elements) is specified from the file name of the printing image, and the simple preview image G is generated based on the printing form, thereby making it possible to display the file list screen D1 in a short time without reading the printing image (contents of file) from the memory unit 54. Particularly, in a case of a configuration in which the memory unit 54 is provided in an external device such as a web server or the like, and a file is read by accessing the external device from the PC 2, it is possible to allow the file list screen D1 to display only the file name which is only loaded instead of file data of all files, and thus it is more effective. In this case, only the selected file data may be loaded to the PC 2 by selecting the file on the file list screen D1.

In addition, since the file name generating unit 53 automatically generates form information relating to the printing image or a file name including characters to be printed on the label L, it is possible to save troubles of inputting a file name by a user and to prevent an erroneous input. In addition, even in a case in which many people share the printing image, since applying methods of file names by a user is not different from one another, each user can easily assume a printing image from the file name. In addition, in the simple preview image G, since the printing form of the printing image or the characters included in the printing image are reflected, the user checks the item, and then, can easily find a desired printing image.

Also, regardless of the above-described embodiment, modification examples as follows can be adopted.

[Modification Example 1]

Figure 12:
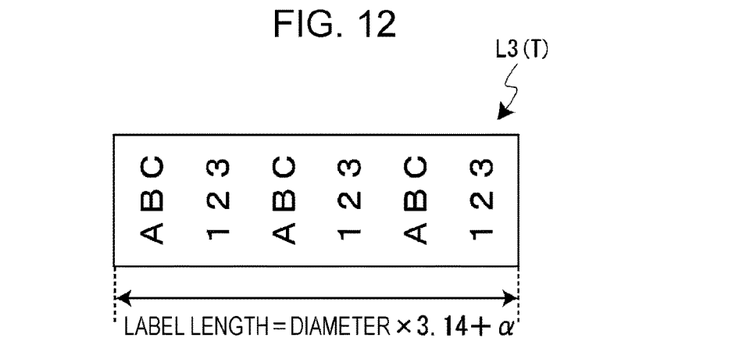
FIG. 12 is a diagram illustrating an example of creating a lap label according to Modification example 1.
Figure 13:
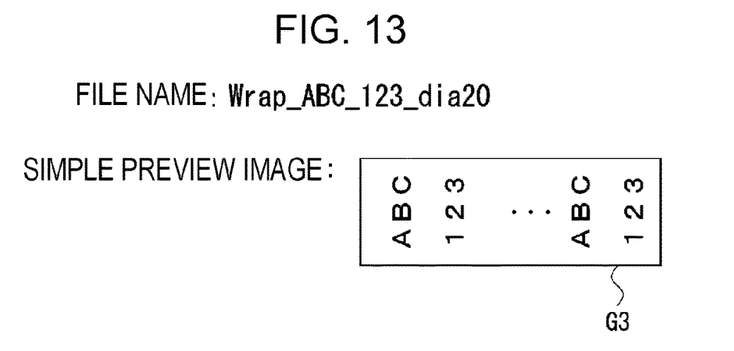
FIG. 13 is a diagram illustrating an example of a file name and an example of a simple preview image of the lap label according to Modification example 1.

As illustrated in FIGS. 12 and 13, the invention may be applied in a case in which a lap label L3 is created. FIG. 12 is a diagram illustrating an example of creating the lap label L3. The lap label L3 is a label which clearly specifies a cable name or the like wound around an object around which a cable or the like is wound. In a case in which the lap label L3 is created, on a label editing screen (not illustrated), a character row having one or more lines is input, and a label length or a diameter of the object around which a cable or the like is wound is set. In a case in which the diameter is set, the label length is obtained by multiplying the length of the diameter by a circumference ratio and adding an additional length (α) having several millimeters to several centimeters. FIG. 13 is a diagram illustrating an example of a file name generated when a printing image of the lap label L3 illustrated in FIG. 12 is stored, and an example of the simple preview image G3 generated based on the file name. In these examples in this drawing, the file name includes the types of the label, a first line character row, a second line character row, and a diameter. In addition, in the simple preview image G3 illustrated in this drawing, the printing format, the first and the second character rows based on the types of the label are reflected.

[Modification Example 2]

Figure 14:
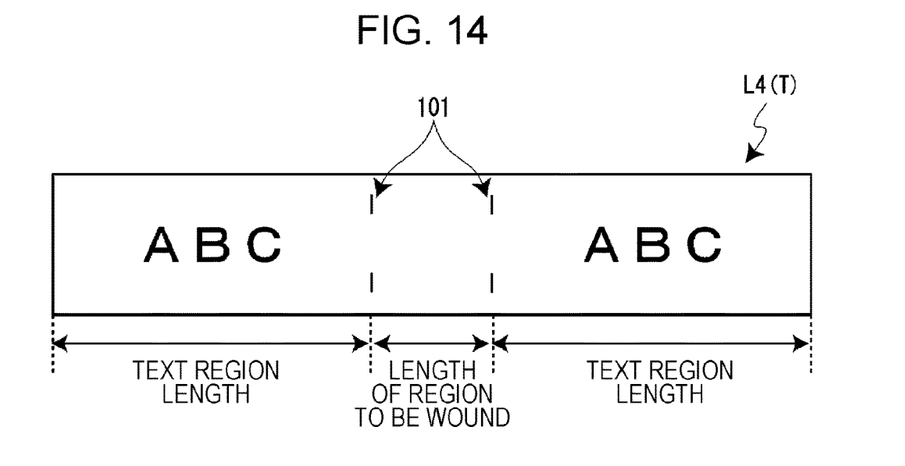
FIG. 14 is a diagram illustrating an example of creating a flag label according to Modification example 2.
Figure 15:
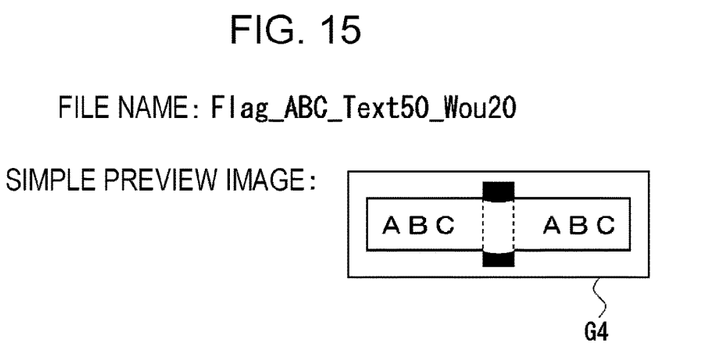
FIG. 15 is a diagram illustrating an example of a file name and an example of a simple preview image of the flag label according to Modification example 2.

In addition, as illustrated in FIGS. 14 and 15, even in a case in which the flag label L4 is created, the invention can be applied. FIG. 14 is a diagram illustrating an example of creating a flag label L4. In the flag label L4, while a winding region in the center thereof is wound around an object around which a cable or the like is wound, text regions on a right side of label and a left side of label are attached to each other so as to form a flag portion which clearly specifies the cable or the like. In a case in which the flag label L4 is generated, on the label editing screen (not illustrated), a character row having one or more lines to be printed on the text region is input, and lengths of the text region and the winding region are set. Also, regarding the character row, different information items for the right side and the left side of the label may be input thereto. In addition, presence or absence, or the types of a boundary mark 101 indicating a boundary between the winding region and the text region may be selected. FIG. 15 is a diagram illustrating an example of a file name generated when the printing image of the flag label L4 illustrated in FIG. 14 is stored, and an example of the simple preview image G4 being generated based on the file name. In these examples in this drawing, the file name includes the types of the label, the character row to be printed on the text region, a length of the text region, and a length of the winding region. In addition, the simple preview image G4 illustrated in this drawing is an image imitating a state of the flag label L4 during being wound around an object around which a cable or the like is wound, the character row to be printed on the text region on each of the right side and the left side of the label is reflected to the simple preview image. Also, the simple preview image G4 may imitate a state of the label L before being wound, in the same manner as that of the simple preview image G1 to G3 described above. In this case, presence or absence, or the types of the boundary mark 101 may be reflected to the simple preview image G4.

[Modification Example 3]

The file name generating unit 53 of the embodiment described above generates the file name including information indicating the printing form (the types of the label and the number of the printing elements) of the printing image, but may have a configuration in which the number of the printing elements is not reflected to the simple preview image G as the printing form =the types of the label.

[Modification Example 4]

In addition, only information indicating the number of the printing elements may be included in the file name. In this case, the types of a tape are specified from the data information detected based on a detected result of the cartridge detecting unit 34, and the types of the label may be specified based on the types of the tape. With such a configuration, even in a case in which the types of the label cannot be specified from the file name, the simple preview image G to which the types of the label and the number of the printing elements are reflected can be generated. In addition, as an additional modification example, the apparatus types of the printing apparatus in which the tape cartridge 31 is mounted (apparatus for creating punch block label, apparatus for creating patch panel label, or the like) may be specified, and the types of the label may be specified based on the types of the printing apparatus.

[Second Embodiment]

Next, with reference to FIG. 16, a second embodiment of the invention will be described. In the first embodiment described above, the label L is created by the PC 2 and the tape printing apparatus 3; however, in the embodiment, the label L is created by only a tape printing apparatus 3'. Hereinafter, differences of the second embodiment from the first embodiment will be described only. Also, in this embodiment, the same reference numeral is given to the same configuration part as that of the first embodiment, and detailed description thereof will be omitted. In addition, the modification examples being applied to the same configuration part as that of the first embodiment are also applied to the second embodiment.

Figure 16:
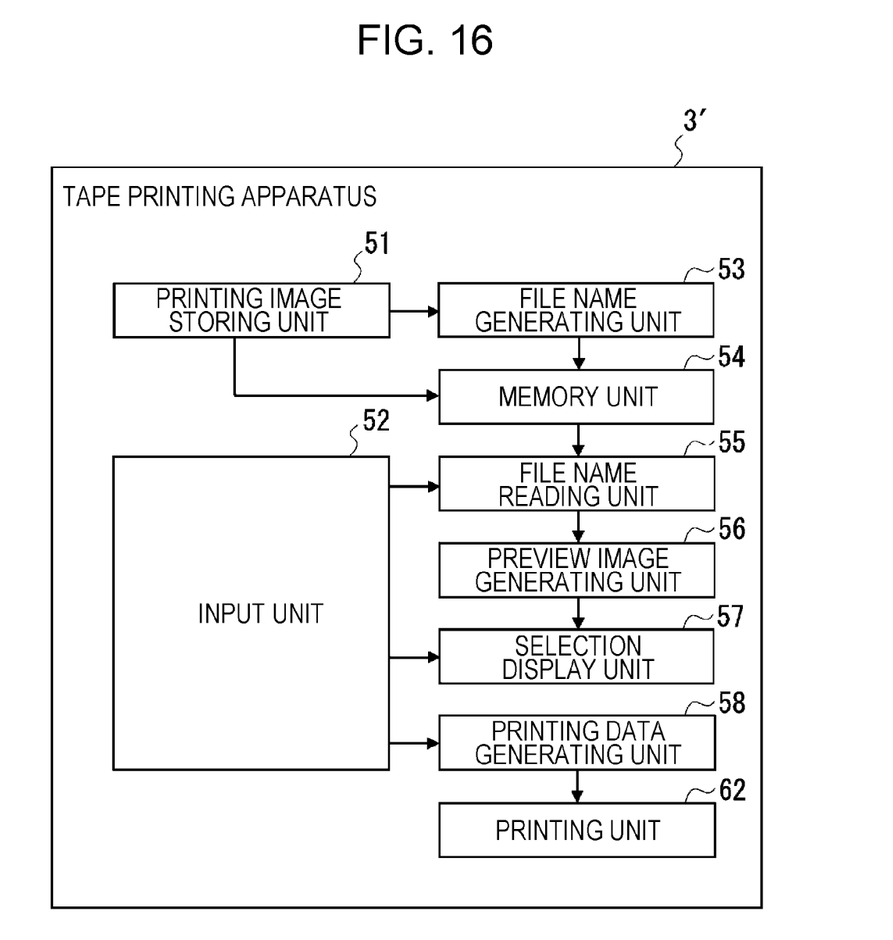
FIG. 16 is a block diagram illustrating a functional configuration of a tape printing apparatus according to a second embodiment.

FIG. 16 is a block diagram illustrating a functional configuration of the tape printing apparatus 3' according to the second embodiment. As illustrated in this drawing, the tape printing apparatus 3' includes the printing image storing unit 51, the input unit 52, the file name generating unit 53, the memory unit 54, the file name reading unit 55, the preview image generating unit 56, the selection display unit 57, the printing data generating unit 58, and the printing unit 62. The input unit 52 inputs information by operation means (keyboard, touch panel, or the like), which is not illustrated, provided in the tape printing apparatus 3' or edits the label. Accordingly, according to the second embodiment, editing and creating of the label L can be easily performed by only a single body of the tape printing apparatus 3'. Also, even in the second embodiment, a configuration in which the memory unit 54 is installed in an external device which is accessible from the tape printing apparatus 3' can be adopted.

Hitherto, the two embodiments and modification examples are described, but each configuration component in the printing system SY (PC 2) or the tape printing apparatus 3' described in the embodiments and examples may be provided as a program. In addition, such a program may be provided by being stored in various recording mediums (CD-ROM, flash memory, and the like). That is, a program causing a computer to be functioned as each configuration component of the printing system SY or the tape printing apparatus 3', the recording medium that records the program, and the label L created by the computer are also included in a range of claims of the invention. In addition, for example, other information processing terminals such as mobile phones and tablet terminals may be used instead of the PC 2 of the first embodiment, or each unit of the PC 2 is realized by cloud computing, the embodiments and examples can be appropriately changed without departing from the gist of the invention.

CROSS REFERENCE TO RELATED APPLICATIONS

This application is a National Stage Entry of International Application No. PCT/JP2016/004370, filed Sep. 28, 2016; which claims priority to Japanese Patent Application No. 2015-199332 filed on Oct. 7, 2015, the entire contents of both of which are incorporated by reference herein.

The invention claimed is:

1. An information processing apparatus comprising:
a file name reading unit configured to read a file name which is a file name of an image to be printed and includes form information indicating a printing form of the image;
a preview image generating unit configured to specify the printing form from the read file name, and to generate a preview image of the image based on the printing form; and
a selection display unit configured to display the preview image as a selection for selecting the image,
wherein the image is a printing image to be printed on a label, and
the form information is information indicating a type of the label and a number of printing elements to be printed on the label.

2. The information processing apparatus according to claim 1, further comprising:
a file name generating unit configured to automatically generate the file name including the form information when the printing image is stored; and
a memory unit configured to store the printing image and the file name in association with each other,
wherein the file name reading unit is configured to read the file name from the memory unit.

3. The information processing apparatus according to claim 2,
wherein the file name generating unit is configured to automatically generate a file name including one or more information items of a label width, a label length, a label color, or a color of a character of the label, and
wherein the preview image generating unit is configured to generate the preview image based on the one or more information items included in the file name.

4. The information processing apparatus according to claim 2,
wherein the printing image includes characters,
wherein the file name generating unit is configured to automatically generate the file name including at least a portion of the characters to be printed on the label, and
wherein the preview image generating unit is configured to generate the preview image including at least the portion of the characters to be printed on the label.

5. The information processing apparatus according to claim 4,
wherein the file name generating unit is configured to automatically generate a file name including one or more information items of a label width, a label length, a label color, or a color of a character of the label, and
wherein the preview image generating unit is configured to generate the preview image based on the one or more information items included in the file name.

6. The information processing apparatus according to claim 4,
wherein the portion of the characters includes a first character which is an initial printing element to be printed on the label, and/or a last character which is a final printing element to be printed on the label.

7. The information processing apparatus according to claim 6,
wherein the file name generating unit is configured to automatically generate a file name including one or more information items of a label width, a label length, a label color, or a color of a character of the label, and
wherein the preview image generating unit is configured to generate the preview image based on the one or more information items included in the file name.

8. A tape printing apparatus comprising:
a file name reading unit configured to read a file name which is a file name of an image to be printed on a label and includes form information indicating a printing form of the image;
a preview image generating unit configured to specify the printing form from the read file name, and to generate a preview image of the image based on the printing form; and
a selection display unit configured to display the preview image as a selection for selecting the image,
wherein the form information is information indicating a type of the label and a number of printing elements to be printed on the label.

9. A display control method of an information processing apparatus, the method comprising:
reading a file name which is a file name of an image to be printed and includes form information indicating a printing form of the image;
specifying the printing form from the read file name, and generating a preview image of the image based on the printing form; and
displaying the preview image as a selection for selecting the image,
wherein the image is a printing image to be printed on a label, and the form information is information indicating a type of the label and a number of printing elements to be printed on the label.

\* \* \* \* \*